W. E. WHITEHEAD & A. T. ATHERTON.
Cotton-Openers.
No. 146,794.        Patented Jan. 27, 1874.
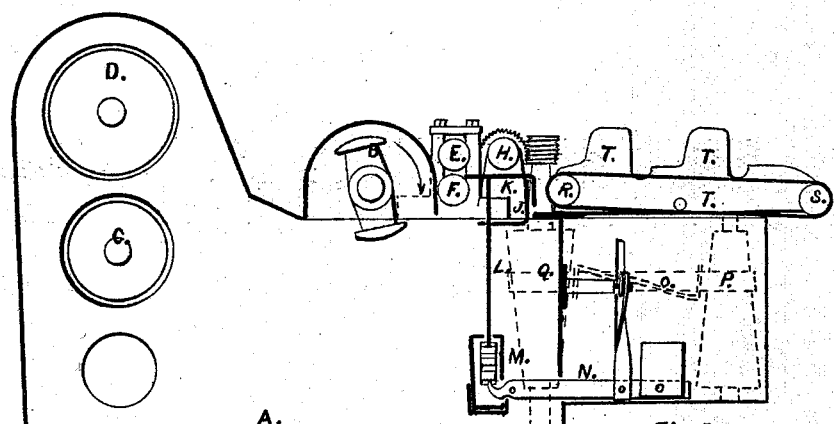
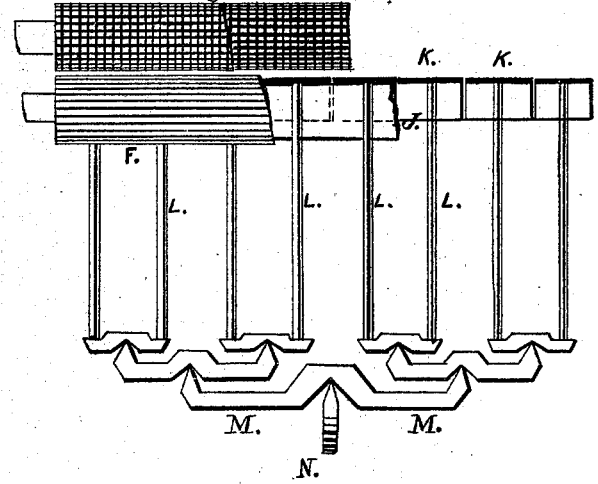
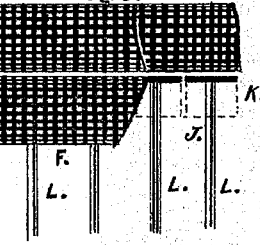
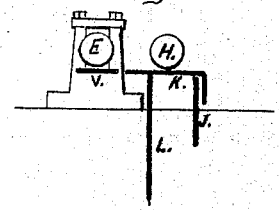
Witnesses.        Inventors.
Albert M. Moore;        William Ed. Whitehead
Greenleaf Wilson        Abel T. Atherton.

UNITED STATES PATENT OFFICE.

WILLIAM E. WHITEHEAD, OF MILES PLATTING, ENGLAND, AND ABEL T. ATHERTON, OF LOWELL, MASSACHUSETTS.

IMPROVEMEMENT IN COTTON-OPENERS.

Specification forming part of Letters Patent No. 146,794, dated January 27, 1874; application filed January 27, 1873.

*To all whom it may concern:*

Be it known that we, WILLIAM E. WHITEHEAD, of Miles Platting, in the county of Lancaster, England, and ABEL T. ATHERTON, of Lowell, in the county of Middlesex and Commonwealth of Massachusetts, have invented certain Improvements in Openers, Scutchers, Lappers, Carding-Engines, &c., for Working Cotton and other fibrous material, of which the following is a specification:

Our invention relates to the process of evening the cotton before it passes between the feed-rolls or other device intended to hold the cotton while being acted upon by the beater, the object of this being to relieve the feed-roll, operating in connection with the plates of the evener, of the extra weight heretofore found necessary when the said feed-roll and plates were required to serve the double purpose of evening the cotton passing through to the beater, and of holding it for the action of the beater upon the same.

In the accompanying drawings, Figure 1 is a general section of a machine embodying our invention. Fig. 2 is a view of a portion of the feed-rolls, showing the plates and other parts connected therewith. Fig. 3 is a view, showing grooved and fluted feed-rolls. Fig. 4 is an enlarged view, in section, of a portion of the surface of one feed-roll. Fig. 5 is an enlarged view of a portion of a grooved and fluted feed-roll. Fig. 6 is a section of a portion of a machine, showing one feed-roll and evener-plates in combination with a feed-roll and a fixed plate.

A is the frame of the machine; B, the beater; C D, the two wire-cloth cylinders, between which the cotton passes after being acted upon by the beater; E F, the two rolls to feed the cotton to the beater; H, the feed-roll, operating in connection with the evener-plates; J, the support or fulcrum for the evener-plates; K K, the evener-plates; L L, rods connecting the evener-plates with levers M M; N, a lever connecting the levers M M with a belt-shipper, O, for the cone-pulleys P Q; R S, apron-rolls; T, one of two apron sides disposed alike on opposite sides of the machine; V, a fixed plate, between which and the feed-roll E, in the modification, Fig. 6, the cotton passes to the beater.

The cotton to be operated upon is placed on the apron in laps supported upon rods resting in semicircular cavities of the apron sides T T, and then passes between the feed-roll H and the evener-plates K K, when, by the combined operation of the parts connected therewith, the speed of the feed-rolls E F is such as to deliver to the beaters a regular and even quantity of cotton.

We have found, by experience, that when the cotton is fed directly to the beater from the evener-plates, so great a weight upon the feed is necessary to prevent the cotton from being drawn in too fast as to destroy the sensitiveness of the evener and impair its usefulness for the purpose intended.

By the use of our invention only so much weight is necessary to be put upon the feed-roll as will pass the cotton over the evener-plates, the feed-rolls E F, between which the cotton afterward passes, performing the work of presenting it to the beater and holding it to be operated upon by the same.

We also have found that, by the use of either one grooved and fluted feed-roll in combination with one simply fluted feed-roll, or of two grooved and fluted feed-rolls operating together, or of one grooved and fluted feed-roll operating in combination with a fixed plate, the cotton passing between the same is held more firmly and with considerably less weight than where either two simply fluted rolls or one simply fluted roll and a stationary plate are used, thereby saving much friction and consequent wear on the bearings of the feed-rolls, and requiring less power to operate the machine.

Apron sides heretofore have been constructed of several parts, the horns or upward projections being fastened to the base of the sides by screws. It is difficult, as well as expensive, to fit these parts together, since the slightest roughness of the parts with which the cotton, in passing to the evener, comes in contact, produces a tearing of the lap. By making the apron sides each in a single piece no roughness or obstacle is presented to interfere with the free passage of the cotton to the evener.

Apron sides have been made each of as many pieces as there were laps to be used on the apron, each piece having two horns or projections formed thereon; but, since a lap is frequently of great weight, and has to be lifted by the hands in such cases over the horns, the height to which the same is thus required to be raised is an objection to the use of two horns on each side for each lap. This inconvenience is obviated by the single-horn construction described above and represented in the drawings.

We claim as our invention—

The combination, with a machine for beating or opening cotton or other fibrous material, of an evening mechanism located between the feed-apron and feed-rolls, for the purpose of evening the cotton after it leaves the feed-apron and before it passes through the apparatus for introducing it to the beater, as and for the purpose set forth.

WILLIAM ED. WHITEHEAD.
ABEL T. ATHERTON.

Witnesses:
ALBERT M. MOORE,
GREENLEAF WILSON.